Jan. 1, 1963 P. SCHLUMBOHM 3,071,311
CENTRIFUGAL FRICTION PUMP
Filed Dec. 15, 1958

INVENTOR.

United States Patent Office 3,071,311
Patented Jan. 1, 1963

3,071,311
CENTRIFUGAL FRICTION PUMP
Peter Schlumbohm, 41 Murray St., New York 7, N.Y.
Filed Dec. 15, 1958, Ser. No. 780,562
3 Claims. (Cl. 230—113)

The present invention is a continuation in part of my co-pending patent application, Ser. No. 354,786, now Patent No. 2,877,865, which itself is a continuation in part of Ser. No. 225,620, now Patent No. 2,706,016. In the parent application a method has been claimed for pumping gases centrifugally from a space of starting pressure to a space of higher pressure by letting the fluid flow through an entry zone into a centrifuging space and by maintaining throughout the centrifuging space a pressure smaller than the starting pressure, by the cooperating measures of (a) restricting the flow of the entering fluid to a one-way, axial porous flow, and (b) restricting the flow of the ejected gas in the ejection zone to a one-way, valved flow.

One modification for executing the method is claimed in my U.S. Patent No. 2,706,016. In that case a plurality of porous discs walls a space between them which is the centrifuging space.

A second modification is claimed in my Patent No. 2,877,865, in which a rotating single disc of porous material and an impervious stationary wall form the walls of the centrifuging space.

A third modification is claimed in my co-pending patent application Ser. No. 780,561, filed December 15, 1958.

The present application constitutes a fourth modification of apparatus for the method claimed in Patent No. 2,877,865.

Figure 1:
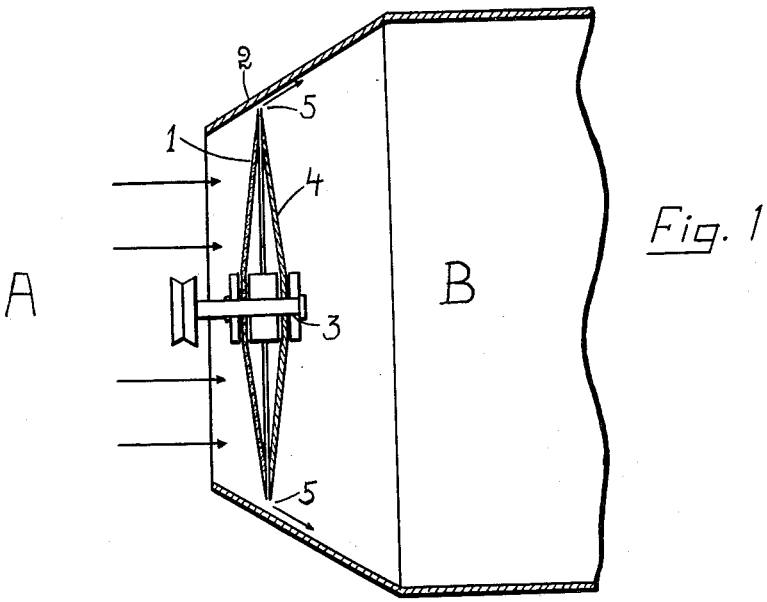
Figure 2:
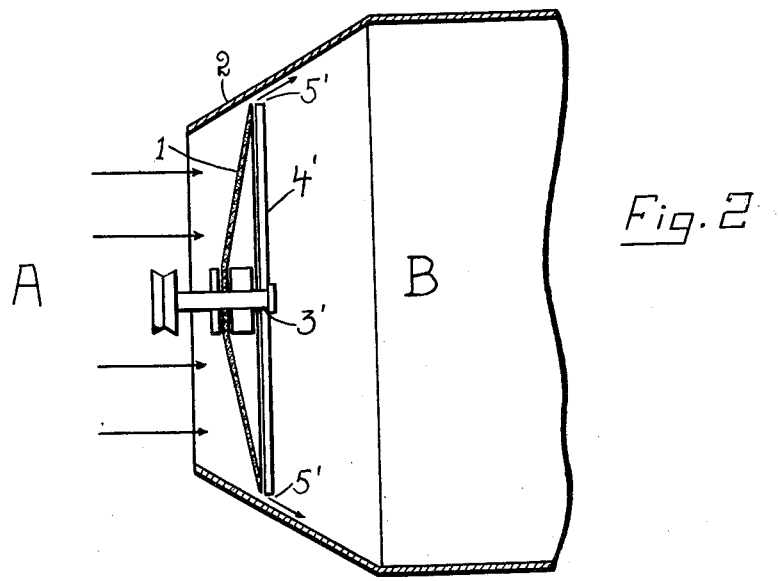

The invention is illustrated in FIG. 1 and FIG. 2 of the accompanying drawings. FIG 1 is a side view, shown partly in view and partly in vertical section. FIG. 1 shows a centrifugal pump comprising one porous disc 1 and one impervious disc 4 arranged on a rotatable shaft 3. The two discs form the walls of the centrifuging space. The fluid enters through the porous disc 1, as indicated by the arrows, and is ejected through the 360° slot 5 at the periphery of the centrifuging space. FIG. 1 illustrates how, in operation, the discs 1 and 4 will be deformed to the frustum of a cone due to the partial vacuum created in the centrifuging space.

A second example of the invention is shown in FIG. 2, which is a side view, partly in view and partly in vertical section. The example differs from the one shown in FIG. 1 by having a rotating impervious stiff disc 4′ instead of the flexible impervious disc 4.

In both examples, the entering fluid flows axially through the pores of the disc 1 in what may be termed a one-way, axial, porous flow, and then flows outwardly through the restricted peripheral ejection zone in what may be termed a one-way, valved flow. The impervious disc has a stabilizer effect on the flow of the fluid which enters through the porous disc into the centrifuging space. In this respect, the impervious disc of greater stiffness, as shown in FIG. 2, is still more stabilizing than the flexible impervious disc shown in FIG. 1. In both cases the fluid may be pumped from the space "A" of starting pressure into a walled space "B" of higher pressure. Part of these walls form a conical deflector 2 for the ejected fluid. One advantage of the present invention is that the fluid can be pumped in a one-way direction, instead of being merely recirculated. The impervious rotating disc 4, 4′ prevents a reentry of the ejected fluid into the centrifuging space. The centrifuging means are used as sealing means to contain the ejected fluid in the walled space.

Having now described the nature of my invention and shown examples of the manner in which it may be performed.

I claim as my invention:
1. A friction pump for centrifuging fluids, having a centrifuging space mounted for rotation around a shaft, comprising a plurality of superposed flexible discs mounted on said shaft and forming the walls of the centrifuging space between them and leaving a 360° open ejection slot at the periphery of the walls, one wall being of porous and flexible material and forming with its pores the intake passage for the fluid entering into the centrifuging space, and the other wall being of impervious material.

2. A friction pump for centrifuging fluids, having a centrifuging space mounted for rotation around a shaft, comprising a plurality of superposed flexible discs mounted on said shaft and forming the walls of the centrifuging space, leaving a 360° open slot at the periphery of the walls, one wall being of porous and flexible material and forming with its pores the intake passage for the fluid entering into the centrifuging space to be centrifuged towards its periphery, and the other wall being of impervious material; a frusto-conical casing in close proximity about the periphery of the discs, the smaller end of the casing extending upstream of the pump, guiding the fluid towards the porous disc, the larger end of the casing extending downstream of the pump, guiding the fluid leaving the ejection slot.

3. A friction pump for centrifuging gases having a central space of starting pressure to an outer annular space of higher pressure, said pump comprising an impeller having a plurality of equal-diameter circular, flexible discs fixed to a shaft and super-posed one on the other and being axially spaced from one another, one disc being from a porous material and the other of impervious material, a frusto-conical casing about the periphery of said discs, the smaller end of the casing extending upstream of the impeller and forming the central space of starting pressure, the larger end of the casing, downstream of the impeller, forming the high-pressure chamber, the disc facing the smaller end being the porous disc and the disc axially spaced therefrom being of impervious material, the periphery of said discs being in close proximity of the inner surface of the wall of the casing, all diameters of the smaller end of the casing being smaller than the diameter of the disc.

References Cited in the file of this patent

UNITED STATES PATENTS

| 2,632,598 | Wales | Mar. 24, 1953 |
| 2,655,310 | Schlumbohm | Oct. 13, 1953 |
| 2,706,016 | Schlumbohm | Apr. 12, 1955 |
| 2,873,908 | Powers | Feb. 7, 1959 |
| 2,889,107 | Stalker | June 2, 1959 |
| 2,910,223 | Schlumbohm | Oct. 27, 1959 |

FOREIGN PATENTS

| 707,767 | Germany | May 29, 1941 |